(12) United States Patent
Lasser

(10) Patent No.: US 6,760,805 B2
(45) Date of Patent: Jul. 6, 2004

(54) FLASH MANAGEMENT SYSTEM FOR LARGE PAGE SIZE

(75) Inventor: Menahem Lasser, Kohav-Yair (IL)

(73) Assignee: M-Systems Flash Disk Pioneers Ltd., Kfar Saba (IL)

(*) Notice: Subject to any disclaimer, the term of this patent is extended or adjusted under 35 U.S.C. 154(b) by 490 days.

(21) Appl. No.: 09/945,803

(22) Filed: Sep. 5, 2001

(65) Prior Publication Data

US 2003/0046484 A1 Mar. 6, 2003

(51) Int. Cl.[7] .............................................. G06F 12/00
(52) U.S. Cl. ...................... 711/103; 711/103; 711/5; 711/203; 711/168; 711/170; 365/185.11; 365/185.29; 365/185.33
(58) Field of Search ............................. 711/103, 5, 168, 711/202, 203, 209, 170; 365/185.11, 185.29, 185.33

(56) References Cited

U.S. PATENT DOCUMENTS

| | | | |
|---|---|---|---|
| 5,404,485 A | | 4/1995 | Ban |
| 5,867,641 A | * | 2/1999 | Jenett ............................. 714/7 |
| 5,937,425 A | | 8/1999 | Ban |
| 6,388,908 B1 | * | 5/2002 | Araki et al. .................. 365/45 |
| 6,591,330 B2 | * | 7/2003 | Lasser ......................... 711/103 |
| 6,622,199 B1 | * | 9/2003 | Spall et al. ................. 711/103 |
| 6,678,785 B2 | * | 1/2004 | Lasser ......................... 711/103 |

OTHER PUBLICATIONS www.samsung.com, Inspiring Products and Vision Unveiled by Samsung Electronics, Sep. 24, 2002, press release.
www.toshiba.com, Storage Device Division, Oct. 8, 2002, & News releases.

* cited by examiner

*Primary Examiner*—Hong Kim
(74) *Attorney, Agent, or Firm*—Mark M. Friedman

(57) ABSTRACT

A system and method for enabling flash memory systems to support flash devices with pages that are larger than operating system data sector sizes, while not violating the device's specifications, and also optimizing performance. According to the present invention, the writing logic of a flash memory system must take into account the PPP limitations and page size of the device during sector write operations. The PPP influences the decision when to simply write the new data, and when to allocate a new page and copy previously existing data to the new page. According to the present invention, when a page contains more than one sector, the software makes the standard translation into physical address, but after finding the address, it examines the page containing that address, and counts the number of other sectors within the same page already containing data. Then a decision is taken whether to write the sector into the calculated physical address, or write the sector into a fresh page, while at the same time, optionally copying the existing neighboring sectors into this fresh page.

37 Claims, 2 Drawing Sheets

FLASH MANAGEMENT SYSTEM FOR LARGE PAGE SIZE

FIELD AND BACKGROUND OF THE INVENTION

1. Field of the Invention

The present invention relates to an improved system for storing and retrieving information in flash memory systems, and more particularly to a system that organizes and manages data written to large page flash memory devices.

2. Description of the Related Art

As will be appreciated by those skilled in the art, electrically erasable and programmable read-only memories (EEPROMs) comprised of flash-type, floating-gate transistors have been described in the art and are presently commercially available. These so-called flash memories are non-volatile memories similar in functionality and performance to EPROM memories, with an additional functionality that allows an in-circuit, programmable, operation to erase blocks of the memory. In a typical flash memory, however, it is not practical to rewrite a previously written area of the memory without a prior block erase of the area.

In a typical computer system, the operating system program is responsible for data management of the data storage devices that are a part of the system. A necessary, and usually sufficient, attribute of a data storage device is to achieve compatibility with the operating system program, such that the operating system can read data from these devices, and write data to any location in these data storage medium. Thus, typical flash memories are not compatible with typical existing operating system programs, since data cannot be written to an area of flash memory in which data has previously been written, unless the area is first erased.

Software mechanisms have been proposed in the art that allow a flash memory to be managed by existing computer operating programs, without modification of the operating system program. However, these prior art programs operate the flash memory as a "write once read many" device. Such known software mechanisms, however, cannot recycle previously written memory locations. When all locations are eventually written, the memory cannot be further used without specific user intervention.

Considering the limitations of flash memory erasing and rewriting, the requirement for a software management system to manage these functions of the flash memory device is imperative. Such a system has been disclosed, for example, in U.S. Pat. No. 5,404,485 of Ban, Amir, filed on Mar. 5, 1993, which is incorporated by reference as if fully set forth herein.

Furthermore, there is a need to enable page-mode devices exemplified by the NAND and AND technologies, to be reorganized when no more unwritten physical units are available. Such a need has been answered by a method for organizing a flash memory, in which the size of the memory portion for reading or writing data, such as a page, differs from the size of the smallest portion for erasing, such as a unit. A Flash file system optimized for page-mode flash technologies has been disclosed, for example, in U.S. Pat. No. 5,937,425 of Ban, Amir, filed on Oct. 16, 1997, which is incorporated by reference as if fully set forth herein. According to both the Ban '425 invention and the present invention, the term "page" is defined as the smallest chunk of data to be written in one operation, and the term "unit" is defined as the smallest chunk of data to be erased in one operation (with a unit containing one or more pages).

Most operating systems (OS) in use today logically organize their file storage systems based on a basic logical data unit of a "sector", which is the smallest amount of data which is read or written by the OS from/to the storage device, be it a magnetic hard disk or a flash memory disk. The most common size of a sector is today 512 bytes, even though other sizes are possible. Because there is some fixed system overhead associated with each read or write operation (regardless of its size), it is more efficient for the OS to handle larger chunks of data, and many OS therefore define such larger chunks (sometimes called "clusters") which combine several sectors into one larger logical entity. Still, at the lowest level of accessing the hardware, the basic unit is still the sector.

For many flash memory disks, the device's physical structure is quite suitable for this OS structure, as the 512-bytes chunk is a basic physical attribute of the flash devices. For example, NAND flash devices physically read and write data in chunks of 512 bytes. Even if there is only a need for reading a single byte, it is still necessary to read 512 bytes from the flash array into an internal buffer within the flash chip, and then access the single desired byte. As a result, using sectors of 512 bytes is relatively efficient in operating systems accessing file systems residing on such flash disks. The flash management systems mentioned above all operate in this way.

Recently, however, there have been announcements of major flash vendors of future devices in which the basic chunk for reading and writing will no longer have basic reading/writing chunk sizes of 512 bytes, but rather have larger size chunks. One such example is Samsung (www.samsung.com—23Fl.-Ka, Taepyung-ro, Chung-gu, Seoul, Korea), who have announced their future K9F1G08U0M-YCB0 1 Gbit device, which has a 2 Kbyte basic read/write page size. Toshiba (www.toshiba.com— Toshiba Corporation, 1—1 Shibaura 1-chome Minato-ku, Tokyo 105–8001, Japan) also announced that it will offer a similar device soon. As the operating systems that will use these devices will still remain based on 512 bytes logical sectors, some performance and/or reliability problems might arise. For example, assume that the OS instructs the flash management system to write 4 data sectors that share the same physical page. Since the write requests are dictated by the requirements of the SW application, we cannot rely on the 4 sectors being written together, and in many cases they will not. Therefore these write requests will typically be executed in 4 separate calls. In the previous situation (of 512 bytes pages), as can be seen in FIG. 1, there is no interference between the 4 write commands, and each sector will be written into a separate flash page independently of the others. However, in the 2K-page case, the 4 sectors share a physical page, and it might not be allowed to write 4 times to the same page without erasing it, thus making the trivial solution of simply writing 4 times into the same page unacceptable. For example, the Samsung device mentioned above only guarantees 3 write operations (known in the technical literature as "Partial Page Programming" or "PPP") before having to erase the page. Of course, it is possible to achieve the above write actions by never writing twice into the same page, and for each request of writing a sector into a page already containing another sector, designate a new page, and write both new and existing data into it. However, this method, as can be seen in FIG. 2, will result in terrible performance hit. In the above example of writing 4 sectors into the same page, if they arrive one by one, the logic of this brute-force method of avoiding the violation of the PPP spec will lead to the following sequence of events:

a. First sector write request arrives
b. Data of first sector is written into first page
c. Second sector write request arrives
d. A second page is designated, first sector is read from first page, and data of first and second sectors is written into second page
e. Third sector write request arrives
f. A third page is designated, first and second sectors are read from second page, and data of first second and third sectors is written into third page
g. Fourth sector write request arrives
h. A fourth page is designated, first second and third sectors are read from third page, and data of all four sectors is written into fourth page Therefore, one sector will be written 4 times, another sector 3 times, still another two times, and only the last to be written is written once (without mentioning the extra read operations needed for copying the previously existing sectors into their new locations).

Therefore there is certainly a need for a method to handle flash memory systems that are capable of supporting flash devices with larger than 512 byte pages, while still not violating the device's specifications and also optimizing performance.

It should be emphasized that for the purpose of the present invention any reference to a flash memory system with a certain page size is not limited to a system composed of flash devices having such page size, but also includes flash memory systems composed of flash devices with smaller page size which are combined together in such way that from the software point of view it becomes impractical to access only a single device page but rather multiple pages are always accessed together. For example flash devices having page size of 512 8-bit bytes may be connected in parallel to a 16-bit data bus such that both can be accessed in parallel on the lower and upper parts of the bus. Such arrangement forces the software to practically have a minimum access size of 512 16-bit words. Therefore, for the purpose of the present invention, such a flash memory system is considered to have a page size of 1 K bytes.

SUMMARY OF THE INVENTION

According to the present invention there is provided a method for enabling flash memory systems to support flash devices with larger than 512 byte pages, while not violating the device's specifications, and also optimizing performance.

The system comprises:
i. a flash memory system of at least one flash device, such that the flash device has flash pages whose size is larger than the operating system's sector size;
ii. a flash management system, which is based on mapping virtual addresses to physical addresses;
iii. an operating system that uses data sectors as basic units. For the purpose of the present invention, an operating system is not limited to the commercially available operating systems such as, for example, Windows operating system from Microsoft Inc., but also includes any software program, that uses a flash management system for managing data in flash devices.

According to the preferred embodiment of the present invention, there is provided a method for enabling writing of data to a flash memory device, where the device supports pages that are larger than data sectors, including the steps of:
i. commanding a flash management system to write at least one data sector;
ii. calculating a physical flash address, such that the address is within a flash page, where the flash page is larger than a data sector; and
iii. deciding whether to write the data sector to the located flash page, or to an alternative, new flash page.

The decision of where to write the sector/s includes two basic options:
a. Write the sector into the calculated physical address (into the free sectors of a possibly partially written large page), or
b. Write the sector into a fresh (empty) page, while at the same time copy the existing neighboring sectors (within the same page) into this fresh page.

The decision of where to write takes into consideration the flash memory device characteristics, such as the page size and/or PPP rules.

A further preferred embodiment of the present invention may add another option to the choices available, which is to write the sector into a fresh (empty) page, but without copying the existing neighboring sectors (within the same page) into this fresh page.

ADVANTAGES OF THE PRESENT INVENTION

The present invention enables flash management systems to support flash devices with large page size, which are not equal in size to the hosting Operating System logical sector size. This is done while not violating the flash specifications, and at the same time achieving good write and read performance.

It should be understood by someone who is skilled in the art of solid-state storage system development, that the inventive methods and systems described herein may be used to develop further embodiments. The above-mentioned embodiments are to be seen as examples, and are in no way meant to limit the technology described herein to these examples alone.

BRIEF DESCRIPTION OF THE DRAWING

The invention is herein described, by way of example only, with reference to the accompanying drawings, wherein.

DETAILED DESCRIPTION OF THE EMBODIMENTS

Figure 1:
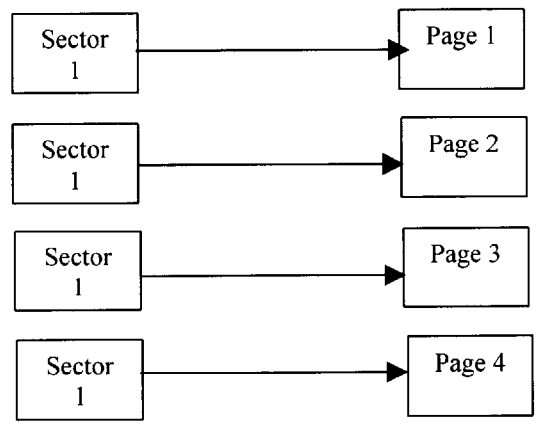
FIG. 1 is an illustration of the basic procedure, known in the art, whereby data segments are written to equal sized pages.
Figure 2:
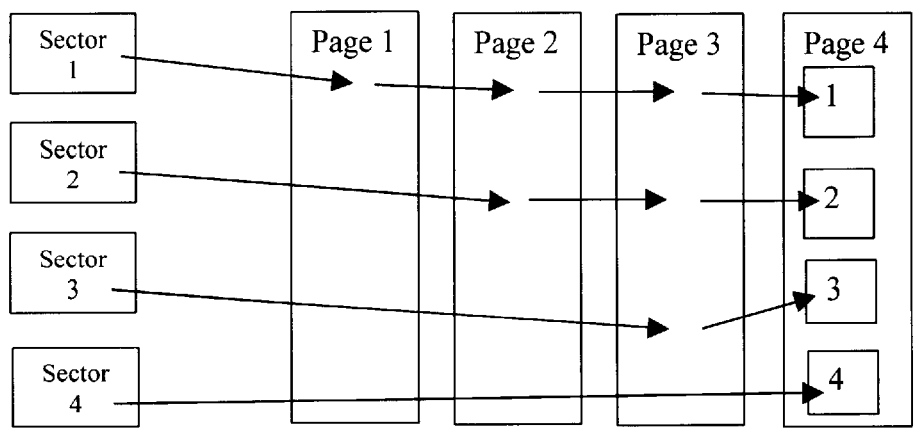
FIG. 2 is an illustration of a trivial data writing procedure for large page flash device configurations, which is highly inefficient.

The present invention is of a method that enables flash memory systems to support flash devices with larger than 512 byte pages, while not violating the device's specifications, and also optimizing performance.

The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Specifically, according to the present invention, the writing logic of a flash management system must take into account the PPP limitations of the device during sector write operations. The PPP influences the decision when to simply write the new data into the default physical location, and when to allocate a new page and copy previously existing data to the new page.

Most flash management systems are based on some mapping of virtual addresses into physical addresses. When the system receives a request to write a sector of data, the command includes a virtual address, which is where the OS logically sees the sector. The flash management SW first translates this into a physical flash address. If the resulting place is free, the write operation is simply done there. If, however, the resulting place is already written, some allocation of a free page is first done (the method and algorithm varying between different flash management systems), and then the write operation is done into the newly allocated page. This is so in the case of flash pages equal in size to sector size.

According to the present invention, when a page contains more than one sector (such as the large page sizes introduced by Samsung Electronics), the software makes the standard translation into physical address, but after finding this address, the software examines the page containing that address, and counts the number of other sectors within the same page already containing data. Then a decision is taken between two options:

a. Write the sector into the calculated physical address (into a free sector of a partially written large page), or
b. Write the sector into a fresh (empty) page, while at the same time copy the existing neighboring sectors (within the same page) into this fresh page.

It should be noted that if the calculated physical address is already written with old data, then there is practically no choice (as flash media cannot simply be over-written) and we must select option "b".

According to a preferred embodiment of the present invention, a possible implementation of the decision rule is to take into account the PPP specification (provided by any flash vendor) and the number of already written sectors in the page. PPP is a specification given by a flash vendor which defines how many times it is allowed to do partial programming into a page (each time programming only a portion of the page data), without causing reliability problems in the data. When reaching this limit, the user must first erase the page before using it for additional writing. The typical range of the PPP value in most commercially available NAND flash devices is in the range of 3 to 10. In this case, option "a." will be selected when writing the sector will not violate (complies with) the PPP specification, and option "b." will be selected when such a write procedure might cause a violation.

Figure 3:
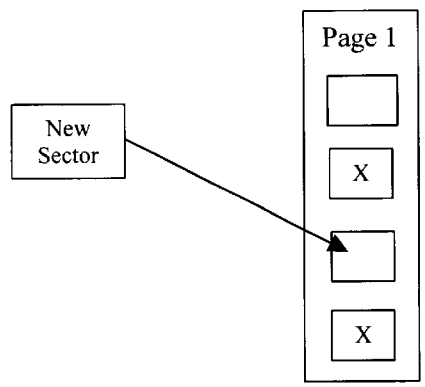
FIG. 3 illustrates the procedure whereby a sector is written into a large page already containing other sectors, in the case whereby there is no rule prohibiting writing the new sector to the same physical page.
Figure 4:
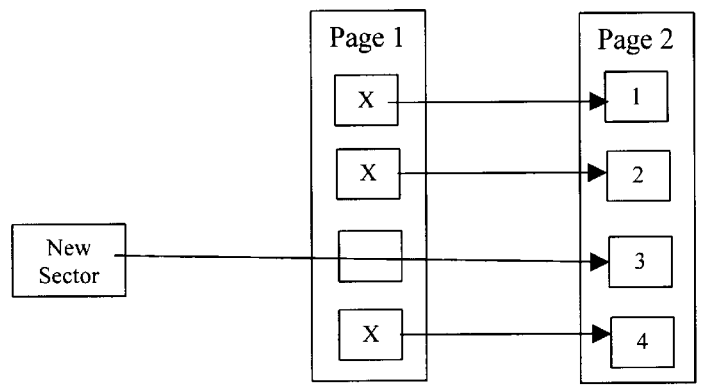
FIG. 4 illustrates the procedure whereby a sector is written into a large page, in the case whereby the page already contains other sectors, and a PPP rule prohibits writing the new sector to the same physical page. In this case the new sector is written to a new page, and existing sectors in the partially written page are copied at the time of writing the new sector.

For example, as can be seen with reference to FIGS. 3 and 4, assume a maximum PPP of 3 and a page containing 4 sectors. One possibility for a decision rule could be that if it is found that 3 sectors or more have already been written in the page, and therefore the 3 PPP allowed write operations might have already been used, it will be deemed necessary to move to a fresh page. In all other cases, where it is clear that less than 3 of the PPP write operations have been used, the system may enable writing of the new sector to its default place. In FIGS. 3 and 4, a box containing an "X" mark indicates a written sector, while an empty box indicates an unused sector. So in the case of FIG. 3, only two sectors are found to be used, and the new sector may be written into its default place. In the case of FIG. 4, three sectors are found to be used, and therefore a fresh page must be employed and existing sectors moved into it. It should be emphasized that while FIG. 4 shows the copying of existing sectors to the new page to preserve both their relative order and their absolute location within a page, this is done only for simplifying the figure and is not necessary for the purpose of the current invention, and any copying scheme may be employed.

The exact decision rule must also take into account any additional write operations required for the control information associated with the page by the flash management system. The calculation is therefore not necessarily a simple numerical comparison as might be deduced from the above example. As a system may contain multiple flash devices of different characteristics, and as the same flash management software may support multiple flash device types, it is advisable to have the system make the determination of the decision rule in real time, according to the device containing the page. It is possible, therefore, that the software may contain logic, which uses different decision rules depending on the specific device involved.

Figure 5:
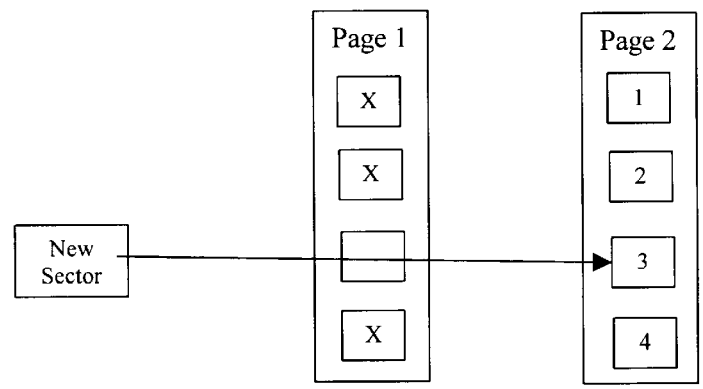
FIG. 5 illustrates the procedure whereby a sector is written into a large page in the case whereby the page already contains other sectors, and a PPP rule prohibits writing the new sector to the same physical page. In this case the new sector is written to a new page, and existing sectors in the partially written page are not copied at the time of writing the new sector.

A further preferred embodiment of the present invention may add another option to the choices available, which is to write the sector into a fresh (empty) page, but without copying the existing neighboring sectors (within the same page) into this fresh page. Such option is practical in some flash management systems, for example in the system of U.S. Pat. No. 5,937,425. This option is described in FIG. 5, which shows a scenario identical to that of FIG. 4, in which no copying of previously written data is executed. This option may be available in addition to the previous two, or it may replace option "b" above, again leaving only a two-way choice. This new option has the advantage of avoiding the cost of copying existing data, but it has the drawback of leaving the logically neighboring sectors in physically different pages. This fact may impact on performance later (for example when having to read all 4 sectors together).

The foregoing description of the embodiments of the invention has been presented for the purposes of illustration and description. It is not intended to be exhaustive or to limit the invention to the precise form disclosed. It should be appreciated that many modifications and variations are possible in light of the above teaching. It is intended that the scope of the invention be limited not by this detailed description, but rather by the claims appended hereto.

What is claimed is:

1. A method for enabling writing of data to at least one flash memory device, such that the device supports pages that are larger than the operating system's data sectors, comprising the steps of:

i. commanding a flash management system to write at least one data sector to a flash memory system, by the operating system;

ii. calculating a physical flash address, such that said address is within a flash page, said flash page being larger than a data sector of said operating system; and iii. choosing whether to write said data sector to said page, or to write said data sector in a new flash page, while at the same time copying existing neighboring sectors within said flash page into said new flash page.

2. The method of claim 1, wherein said flash management system supports more than one flash device type, combination of said devices providing a plurality of characteristics, wherein choice on each sector write is effected by said characteristics of each specific device to be written.

3. The method of claim 1, wherein said choice is dependent on PPP specifications of the flash memory device.

4. The method of claim 1, wherein said choice is dependent on number of used sectors already existing in said page into which said new data sector is mapped.

5. The method of claim 1, wherein said choice is dependent on PPP specifications of the flash memory device and on number of used sectors already existing in said page into which said new data sector is mapped.

6. The method of claim 2, wherein said flash management system supports more than one flash device type, combination of said devices providing a plurality of PPP specifications, wherein choice on each sector write is effected by said PPP specifications of each specific device to be written.

7. A method for enabling writing of data to at least one flash memory device, such that the device supports pages that are larger than the operating system's data sectors, comprising the steps of:

i. commanding a flash management system to write at least one data sector to a flash system, by the operating system;

ii. calculating a physical flash address, such that said address is within a flash page, said flash page being larger than said operating system's data sectors; and iii. choosing whether to write said data sector to said page, or to write said data sector in a new flash page, without copying existing neighboring sectors within said flash page into said new flash page.

8. The method of claim 7, wherein said flash management system supports more than one flash device type, combination of said devices providing a plurality of characteristics, wherein choice on each sector write is effected by said characteristics of each specific device to be written.

9. The method of claim 7, wherein said choice is dependent on PPP specifications of the flash memory device.

10. The method of claim 7, wherein said choice is dependent on number of used sectors already existing in said page into which said new sector is mapped.

11. The method of claim 7, wherein said choice is dependent on PPP specifications of the flash memory device and on number of used sectors already existing in said page into which said new data sector is mapped.

12. The method of claim 8, wherein said flash management system supports more than one flash device type, combination of said devices providing a plurality of PPP specifications, wherein choice on each sector write is effected by said PPP specifications of each specific device to be written.

13. A method for enabling writing of data to at least one flash memory device, such that the device supports pages that are larger than the operating system's data sectors, comprising the steps of:

i. commanding a flash management system to write at least one data sector to a flash system, by the operating system;

ii. calculating a physical flash address, such that said address is within a flash page, said flash page being larger than said operating system's data sectors; and iii. choosing whether to write said data sector to said page, or to write said data sector in a new flash page, while at the same time copying existing neighboring sectors within said flash page into said new flash page, or to write said data sector in a new flash page, without copying existing neighboring sectors within said flash page into said new flash page.

14. The method of claim 13, wherein said flash management system supports more than one flash device type, combination of said devices providing a plurality of characteristics, wherein choice on each sector write is effected by said characteristics of each specific device to be written.

15. The method of claim 13, wherein said choice is dependent on PPP specifications of the flash memory device.

16. The method of claim 13, wherein said choice is dependent on number of used sectors already existing in said page into which said new data sector is mapped.

17. The method of claim 13, wherein said choice is dependent on PPP specifications of the flash memory device and on the number of used sectors already existing in said page into which said new data sector is mapped.

18. The method of claim 14, wherein said flash management system supports more than one flash device type, combination of said devices providing a plurality of PPP specifications, wherein choice on each sector write is effected by said PPP specifications of each specific device to be written.

19. A system for enabling writing of data to a flash memory device, such that the device supports pages that are larger than the operating system data sectors, comprising:

i. a flash memory system comprised of at least one flash device, such that said at least one flash device has flash pages that are larger in size than the operating system data sector size, and such that said at least one flash device has a limit on a number of Partial Page Programming operations allowed in said pages before having to erase said pages;

ii. a flash management system, which manages said flash memory system by mapping virtual flash addresses to physical flash addresses;

iii. an operating system that uses data sectors as basic units, such that said operating system uses said flash management system to write and read data to and from said flash memory system.

20. The system of claim 19, wherein said flash management system operates by making a choice for each sector write request which is mapped to a physical flash address, wherein a page containing said physical address may already contain previously written sectors, said choice is between:

a) writing said sector into said sector's currently mapped physical address; and b) writing said sector into a new page, while at the same time copying existing neighboring sectors within said page into said new page.

21. The system of claim 20, wherein said flash management system supports a plurality of flash device types, combination of said devices providing a plurality of characteristics, wherein a choice on each sector write is effected by said characteristics of each specific device to be written.

22. The system of claim 20, wherein said choice is dependent on PPP specifications of said flash memory system.

23. The system of claim 20, wherein said choice is dependent on number of used sectors already existing in said page, into which said new sector is mapped.

24. The system of claim 20, wherein said choice is dependent on PPP specifications of said flash memory system and on number of used sectors already existing in said page into which said new sector is mapped.

25. The system of claim 21, wherein said flash management system supports a plurality of flash device types, combination of said devices providing a plurality of PPP specifications, wherein a choice on each sector write is effected by said PPP specifications of each specific device to be written.

26. The system of claim 19, wherein said flash management system operates by making a choice for each sector write request which is mapped to a physical flash address, wherein a page containing said physical address may already contain previously written sectors, said choice is between:
   a) writing said sector into said sector's currently mapped physical address; and
   b) writing said sector into a new page, without copying existing neighboring sectors within said page into said new page.

27. The system of claim 26, wherein said flash management system supports a plurality of flash device types, combination of said devices providing a plurality of characteristics, wherein a choice on each sector write is effected by said characteristics of each specific device to be written.

28. The system of claim 26, wherein said choice is dependent on PPP specifications of the flash memory system.

29. The system of claim 26, wherein said choice is dependent on number of used sectors already existing in said page into which said new sector is mapped.

30. The system of claim 26, wherein said choice is dependent on PPP specifications of said flash memory system and on number of used sectors already existing in said page into which said new sector is mapped.

31. The system of claim 27, wherein said flash management system supports a plurality of flash device types, combination of said devices providing a plurality of PPP specifications, wherein a choice on each sector write is effected by said PPP specifications of each specific device to be written.

32. The system of claim 19, wherein said flash management system operates by making a choice for each sector write request which is mapped to a physical address, wherein a page containing that physical address may already contain previously written sectors, said choice is between: a) writing said sector into said sector's currently mapped physical address;
   b) writing said sector into a new page, while at the same time copying existing neighboring sectors within said page into said new page; and
   c) writing said sector into a new page, without copying existing neighboring sectors within said page into said new page.

33. The system of claim 32, wherein said flash management system supports a plurality of flash device types, combination of said devices providing a plurality of characteristics, wherein a choice on each sector write is effected by said characteristics of each specific device to be written.

34. The system of claim 32, wherein said choice is dependent on PPP specifications of said flash memory system.

35. The system of claim 32, wherein said choice is dependent on number of used sectors already existing in said page into which said new sector is mapped.

36. The system of claim 32, wherein said choice is dependent on PPP specifications of said flash memory system and on number of used sectors already existing in said page into which said new sector is mapped.

37. The system of claim 33, wherein said flash management system supports a plurality of flash device types, combination of said devices providing a plurality of PPP specifications, wherein a choice on each sector write is effected by said PPP specifications of each specific device to be written.

* * * * *